US006798762B1

(12) United States Patent
Olson

(10) Patent No.: US 6,798,762 B1
(45) Date of Patent: Sep. 28, 2004

(54) DIGITAL WIRELESS COMMUNICATION SYSTEM FOR SIMULTANEOUSLY CONVEYING FULL RATE SPEECH DATA AND DEDICATED USER DATA

(75) Inventor: John W. Olson, Morristown, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/119,281

(22) Filed: Jul. 20, 1998

(51) Int. Cl.[7] ................................................. H04Q 7/24
(52) U.S. Cl. ..................... 370/338; 370/352; 370/471; 370/493; 370/532; 370/535
(58) Field of Search ................................ 370/244, 245, 370/252, 278, 281, 282, 299, 332, 333, 352, 353, 356, 358, 360, 386, 395.5, 395.51, 395.52, 466, 467, 470, 493, 496, 532, 535, 901, 902, 908, 912, 913, 914, 338, 471

(56) References Cited

U.S. PATENT DOCUMENTS

| | | | | |
|---|---|---|---|---|
| 5,504,773 A | * | 4/1996 | Padovani et al. | 375/130 |
| 5,818,871 A | * | 10/1998 | Blakeney et al. | 375/220 |
| 5,881,105 A | * | 3/1999 | Balachandran et al. | 375/259 |
| 5,958,006 A | * | 9/1999 | Eggleston et al. | 709/219 |
| 6,097,772 A | * | 8/2000 | Johnson et al. | 375/346 |
| 6,256,509 B1 | * | 7/2001 | Tanaka et al. | 455/515 |
| 6,295,302 B1 | * | 9/2001 | Hellwig et al. | 370/522 |
| 6,421,374 B2 | * | 7/2002 | Blakeney et al. | 375/220 |

OTHER PUBLICATIONS

By B.S. Atal et al., "Speech and Audio Coding for Wireless and Network Applications" Kluwer academic publishers, 1993, pp. 85–92.
TIA/EIA/IS–707.1 Data Service Options for Wideband Spread Spectrum Systems: Introduction and Service Guide. Ballot Resolution Version. pp. 1–1–4–2. Nov. 19, 1997.
TIA/EIA/IS–707.2 Data Service Options for Wideband Spread Spectrum Systems: "Radio Link Protocol". Ballot Resolution Version. pp. 1–1–2–41. Nov. 19, 1997.
TIA/EIA/IS–707.5 Data Service Options For Wideband Spread Spectrum Systems: "Packet Data Services". Ballot Resolution Version, pp. 1–1–4–2. Nov. 19, 1997.

* cited by examiner

Primary Examiner—Dang Ton
Assistant Examiner—Inder Pal Mehra
(74) Attorney, Agent, or Firm—Priest & Goldstein, PLLC

(57) ABSTRACT

In a digital wireless communication system wireless communication stations or radio base stations constitute frames to be conveyed over an air-interface for simultaneously comprising full rate speech data and dedicated user data. A speech coder in the digital wireless communication system generates the speech data while operating at a full rate. A user data application in the digital wireless communication system generates the dedicated user data. The system can set different service configurations supporting simultaneous transmission of speech data and dedicated user data, and can also include signaling data in the frames.

16 Claims, 2 Drawing Sheets

DIGITAL WIRELESS COMMUNICATION SYSTEM FOR SIMULTANEOUSLY CONVEYING FULL RATE SPEECH DATA AND DEDICATED USER DATA

FIELD OF THE INVENTION

The present invention relates to a digital wireless communication system. Such a system can be a cellular or other wireless communication system including wireless communication stations such as mobile radio handsets, combined mobile radio data processing devices, cordless telephones, or any other suitable wireless telephone device. The system can be any frame oriented system suitable for conveying speech data, control data, and user data.

BACKGROUND OF THE INVENTION

From the handbook "Speech and Audio Coding for Wireless and Network Applications", B. S. Atal et al., Kluwer Academic Publishers, 1993, pp. 85–92, a variable speech or adaptive rate coder is known for use in a digital cellular telephone system. From speech signal samples, the speech coder generates speech coder data which are typically contained in 20 ms frames. Periods of silence in the speech signal and background noise are coded at a lower rate so that system capacity is increased. For signaling data to be sent, the system can instruct the speech coder to encode the speech at half rate for one or two frames, allowing the remaining bits which would have been used for full rate speech data instead. Because speech is only coded at half rate for 20–40 ms, speech quality is not significantly degraded, though the amount of signaling data that can be conveyed without causing degrading of speech quality is limited.

The proposed TIA/EIA/IS-707 Standard defines data service options for wideband spread-spectrum systems. At a Rate Set 1, at full rate operation of a speech coder in the system, so-called Primary Traffic is conveyed in bits/frame. At a lower rate of the speech coder, the frame may contain signaling traffic bits or so-called Secondary Traffic bits. The signaling bits are to be considered as in-band data and the Secondary Traffic can consist of user data. Particularly when there is a desire to simultaneously convey speech data and a moderate amount of user data, the speech quality is substantially degraded. This is due to the fact that the speech coder is then forced to operate at a lower rate for a great number of speech frames, i.e., not only for frames containing silent speech periods and/or background noise information but also for speech frames carrying meaningful speech data. Typical applications today in which considerable amounts of data have to be conveyed, either uni-directional or bidirectional, are Internet applications, or the like. In this respect, there is a trend to couple or integrate cellular phones with data devices or personal computers.

Thus, what is needed is a mechanism of simultaneously conveying speech data and substantial amounts of user data without substantially degrading speech quality.

SUMMARY OF THE INVENTION

It is an object of the invention to provide a digital wireless communication system simultaneously conveying high quality speech signal data and optimal rate dedicated user data.

It is another object of the invention to further optimise the throughput of the dedicated user data in the event speech signal data can be transmitted without substantial decrease of speech quality.

It is yet another object of the invention to also simultaneously exchange signaling data.

It is yet another object of the invention to flexibly adjust the type of data to be exchanged between the wireless communication infrastructure network and the wireless communication stations.

It is yet another object of the invention that the system can independently act upon speech data and dedicated user data, preferably using different protocols for speech data and dedicated user data, preferably applying a protocol most suitable for processing dedicated user data.

It is yet another object of the invention to make available a means for exchanging data which is optimal when data traffic is extended over a long period but is irregular.

In accordance with the invention, a digital wireless communication system is provided which comprisies a wireless communication infrastructure network and a plurality of wireless communication stations configured for wireless communication with the wireless communication infrastructure network, the communication using an air-interface protocol for exchanging data in frames, which frames are constituted for simultaneously comprising speech data generated at a full rate by a speech coder and dedicated user data generated by a user data application .

A great advantage is that it always can be guaranteed that the speech coder can operate at full rate on meaningful speech signal samples so that speech quality is not degraded, while at the same time dedicated user data can continuously and uninterruptedly be conveyed. On a frame-by-frame basis, the rate of the speech coder can be adapted so that maximum throughput can be achieved in conveying the dedicated user data. Preferably having a dedicated user data channel independent of the speech data channel on the same air-interface frame provides low cost simultaneous voice and data services.

Preferably, data throughput of dedicated user data is increased at instances where speech data can be transmitted at a lower rate without loss of speech quality. Preferably, speech and dedicated user data are independently routed and processed by the system. Further embodiments are discussed hereinafter.

The invention can advantageously be used for Internet applications, or the like. Another very advantageous application is conveying dedicated user data while using a bi-directional data link that is open for a long period of time. Herewith, applications such as interactive paging and web-chatting, or even simultaneous exchange of still picture data with high quality cellular voice data link, can be easily implemented because the data link is open all the time and can be used at choice, i.e. for data transmission of dedicated user data system resources are only used when needed. Another great advantage is that the user data link does not interfere with usual signaling or control in the cellular system, i.e. cellular system control is not made more complex as compared to existing systems.

DESCRIPTION OF THE PREFERRED EMBODIMENT

Figure 1:
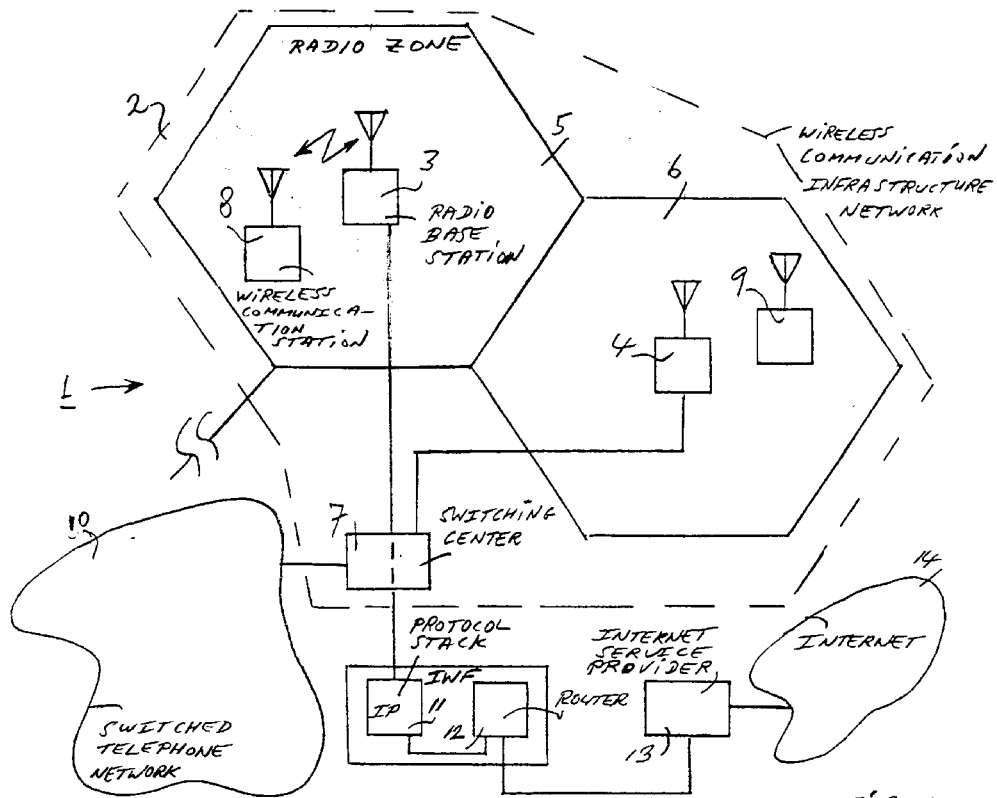
FIG. 1 schematically shows a digital wireless communication system in accordance with the invention.

FIG. 1 schematically shows a digital wireless communication system 1 in accordance with the invention. The system 1 comprises a wireless communication infrastructure network 2 of radio base stations 3 and 4 covering radio zones 5 and 6, respectively, and of a switching center 7. The system 1 further comprises wireless communication stations 8 and 9 for wireless communication with the wireless communication infrastructure network 2. In principle, the wireless communication system 1 can be any digital wireless system such a CDMA or TDMA system. In the embodiment given, the system 1 is a CDMA system. At a logical system level, the data to be transmitted and received are multiplexed in frames which will be described in the sequel. The frames are transmitted via a so-called air-interface. To this end, all data, such as speech data, dedicated user data and control data are modulated on a carrier frequency. Such techniques are well-known in the art and are not described in detail here. The switching center 7 is coupled to a switched telephone network 10 of fixed network subscribers so that the wireless communication stations 8 and 9 can call such fixed network subscribers. The switching center 7 transparently exchanges speech data between the wireless communication infrastructure network 2 and the switched telephone network 10, i.e., the speech data are not subjected to a further processing protocol. The switching center 7 is further coupled to a so-called IWF, an Inter Working Function through which a wireless communication station can request a packet data service. Herewith, data transmission is instantiated for simultaneous operation with speech or voice communication. The Inter Working Function IWF comprises a protocol stack 11 and a router 12 which is coupled to an Internet Service Provider 13 coupled to an Internet 14. The dedicated user data are thus exchanged using a non-transparent link protocol, i.e., dedicated user data are subject to processing between end-users. Such processing and routing of dedicated user data as such is well-known in the art and will not be described in further detail here. In the example given, packet data service is based on a simple Internet Protocol IP using Internet standard protocol stacks. Packet data service may also be based on other protocols such as using CDPD emulation, Cellular Digital Packet Data, as defined in Service option 16 of said TIA/EIA/IS707 Standard.

Figure 2:
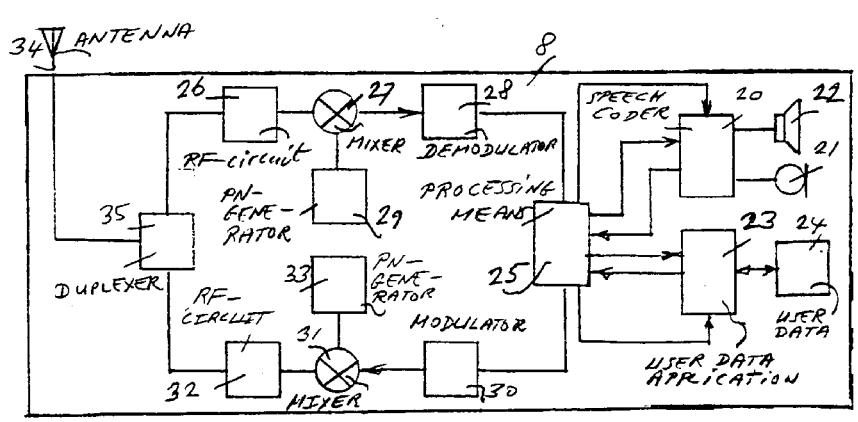
FIG. 2 is a block diagram illustrating an embodiment of a wireless communication station in accordance with the invention.

FIG. 2 is a block diagram illustrating an embodiment of the wireless communication station 8 in accordance with the invention. The wireless communication station 8 comprises a speech coder 20 coupled to a microphone 21 and an earpiece or speaker 22. Sampling and reconstruction functionality, using an analog-to-digital converter and a digital-to-analog converter, is included in the speech coder 20. The wireless communication station 8 further comprises a user data application 23 for bi-directionally providing dedicated user data 24, and processing means 25 for multiplexing and demultiplexing speech and dedicated user data. The user data application may be integrated in the wireless communication station 8, as shown, or may be performed by a separate device such as a personal computer coupled to the wireless communication station 8. The processing means 25 controls the speech coder 20 and the user data application 23. Particularly, the processing means 25 is configured to set the rate of the speech coder 20. The wireless communication station 8 further comprises a receive and transmit branch, coupled to the processing means 25, for receiving and transmitting radio frequency signals. The receive branch comprises a radio frequency reception circuit 26, a mixer 27, and a demodulator 28, and further a PseudoNoise-generator, 29 coupled to the mixer 27. The transmit branch comprises a modulator 30, a mixer 31, and a radio frequency transmit circuit 32, and further a PseudoNoise-generator 33. The RF-circuits 26 and 32 are coupled to an antenna 34 through a duplexer 35.

Figure 3:
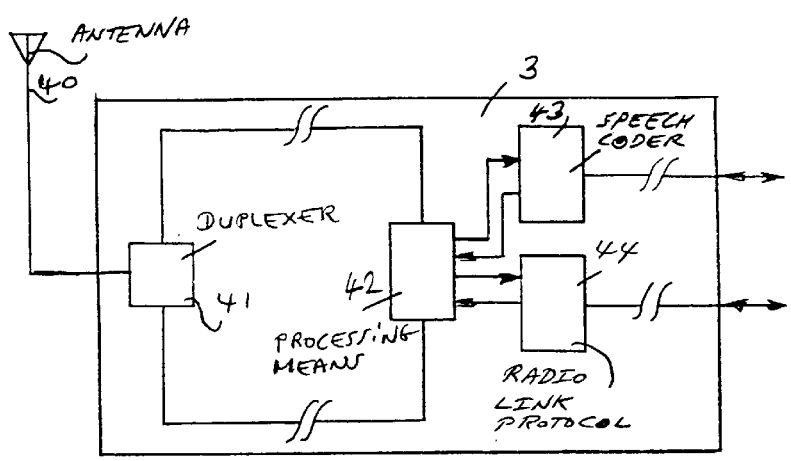
FIG. 3 is a block diagram illustrating an embodiment of a radio base station for use in a wireless communication infrastructure network in accordance with the invention.

FIG. 3 is a block diagram illustrating an embodiment of the radio base station 3 for use in the wireless communication infrastructure network 2 in accordance with the invention. The radio base station 3 comprises several radio frequency transceivers of which one is shown in FIG. 3. Shown is an antenna 40 coupled to a duplexer 41 coupled to processing means 42 through radio frequency and modulation and demodulation transmit and receive branches similar to the transmit and receive branches shown in FIG. 2, and not shown in detail here. The radio base station 3 further comprises a speech coder 43 bi-directionally coupled to the switching center 7 shown in FIG. 1. Alternatively, the speech coders can be located in the switching center 7. The radio base station 3 further comprises a radio link protocol 44 for independent handling of dedicated user data simultaneously comprised in frames of speech data. Similar to what is described in the TIA/EIA/IS-707 Standard, a so-called Link Layer connection is opened for the wireless communication station 8 for rendering the wireless communication station's packet data service active. The packet service must be instantiated initially. This can be done at powering up of the wireless communication station, or at user instantiation after powering up. The Link Layer connection can be either active or dormant. While the Link Layer connection is dormant, the wireless communication station 8 may use other services. The switching center 7 will not page the wireless communication station 8 for dedicated user data packets intended for the station 8 during such other services, e.g., a circuit switched data service such as fax, with the exception of a valid simultaneous voice call. Dedicated user data packets that arrive at the IWF will be discarded if the other service is not valid for concurrent operation. Dedicated user data packets may be lost, however, the lost packets in general will be detected and retransmitted by higher layer protocols when the other service is ended.

Figure 4:
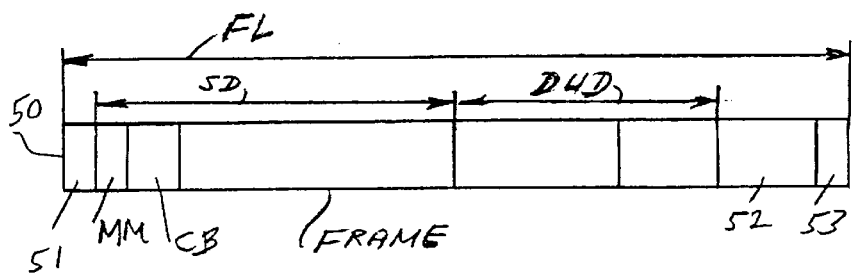
FIG. 4 is a frame illustrating an embodiment of simultaneous transmission of full rate speech coder data and dedicated user data in the digital wireless communication system of FIG. 1.

FIG. 4 is a frame 50 illustrating an embodiment of simultaneous transmission of full rate speech coder data and dedicated user data in the digital wireless communication system of FIG. 1. The frame 50 has a frame length FL of 20 msec, a length typically used when transmitting speech parameters generated by a speech coder through the air interface. According to the invention, in addition to speech data SD, generated by the speech coder 20 or 43 at full rate, the frame comprises dedicated user data DUD. Herewith, transmission of speech data is guaranteed while maintaining the best speech quality with the coder used, and continuous transmission of dedicated user data. A multi-mode bit MM, together with three other control bits CB in the speech data part SD control the rate of the coder at reception side, and the number of bits used for data over voice, i.e., the number of bits of the dedicated user data DUD. If the speech coder 20 detects silent periods in the speech signal to be encoded, or when background noise information is to be conveyed, the processing means 25 adapt the rate of the speech coder 20 to a lower rate so that more bits are available in the corresponding frame for conveying the dedicated user data DUD. In addition to the shown bits, the frame 50 further comprises header and error control/tailer bits 51, 52, and 53. The frame typically contains a total of 288 bits so that the frame rate is 14,400 bits. At full rate, the speech data SD, including control, comprise 172 bits, and the dedicated user data, including control, 95 bits. With the multi-mode bit MM set to '0', the coder 20 operates at full rate. With the multi-mode bit MM set to '1', the coder 20 operates at a lower rate, the particular rate further being determined by the control bits CB. Then, with the control bits CB set to '100' or '101', the speech coder 20 operates at½ rate or ⅛ rate, respectively. The excess bits are added to the dedicated user data DUD. With the control bits CB set to '111'. when the multi-mode bit MM is set to '1', all bits in the frame 50 are available for exchanging the dedicated user data DUD. The frame 50 represents the frame at the air-interface when the system is in a traffic channel state. In addition to the described combination of speech data and dedicated user data, the frame may contain other combinations of data, particularly signaling data. The table below shows possible combinations of data in the frame 50, i.e., a service configuration as regards the types of traffic in the traffic channel, indicated with Frame No., SD being the speech data, PRIM being primary data, SEC being secondary data, DOV being data over voice, and TOT being the total number of bits. Under the heading Multiplexed Voice/Data Services, a symbol 'x' indicates the selection of multiplexed services.

option in accordance with the above table. The wireless communication station 8 can request a default service configuration associated with a service option at call origination, and can request new service configurations during traffic channel operation. If the wireless communication station 8 requests a service option that is acceptable to the radio base station 3, they both begin using the new service configuration. If the wireless communication station 8 requests a service option that is not acceptable to the radio base station 3, the radio base station 3 can reject the requested service configuration or propose an alternative service configuration. If the radio base station 3 proposes an alternative service configuration, the wireless communication station can accept or reject the base radio base station's proposed service configuration, or propose yet another service configuration. This process, so-called service negotiation, ends when the wireless communication station 8 and the radio base station 3 find a mutually acceptable service configuration, or when the wireless communication station 8 or the radio base station 3 rejects a service configuration proposed by the other. It is also possible for the radio base station 3 to request a default service configuration associated with a service option when paging the wireless communication station 8 and request new service configurations during traffic channel operation. The service negotiation proceeds as described above, but with the roles

|           | Multiplexed Voice/Data Services | | | | | Information Bits per Frame | | | | |
|-----------|----|-----|-----|-----|------------|--------|-----|-------|------|-----|
| Frame No. | SD | SIG | SEC | DOV | Coder Rate | PRIM   | SIG | SEC   | DOV  | TOT |
| 1  | x |   |   |   | 1   | 1+171 | —     | —     | —    | 172 |
| 2  | x |   |   |   | 1/2 | 80    | —     | —     | —    | 80  |
| 3  | x |   |   |   | 1/8 | 16    | —     | —     | —    | 16  |
| 4  |   |   |   | x | —   | —     | —     | —     | 88+7 | 95  |
| 5  | x |   |   | x | 1   | 1+171 | —     | —     | 88+7 | 267 |
| 6  | x |   |   | x | 1/2 | 80    | —     | —     | 88+7 | 175 |
| 7  | x |   |   | x | 1/8 | 16    | —     | —     | 88+7 | 111 |
| 8  | x |   | x | x | 1/2 | 4+80  | —     | 88    | 88+7 | 267 |
| 9  | x |   | x | x | 1/8 | 4+16  | —     | 152   | 88+7 | 267 |
| 10 |   |   | x | x | —   | —     | —     | 4+168 | 88+7 | 267 |
| 11 | x | x |   | x | 1/2 | 4+80  | 88    | —     | 88+7 | 267 |
| 12 | x | x |   | x | 1/8 | 4+16  | 152   | —     | 88+7 | 267 |
| 13 |   | x |   | x | —   | —     | 4+168 | —     | 88+7 | 267 |
| 14 | x | x |   |   | 1/2 | 4+80  | 88    | —     | —    | 172 |
| 15 | x | x |   |   | 1/8 | 4+16  | 152   | —     | —    | 172 |
| 16 |   | x |   |   | —   | —     | 4+168 | —     | —    | 172 |
| 17 | x |   | x |   | —   | —     | —     | 88    | —    | 172 |
| 18 | x |   | x |   | —   | —     | —     | 152   | —    | 172 |
| 19 |   |   | x |   | —   | —     | —     | 4+168 | —    | 172 |

Frame No. 5 or category may be used for full rate circuit switched data, primary and DOV.

Dedicated user data are exchanged using a packet data service, if the Link Layer connection is open and active, as described before. The Link Layer connection is active if cellular system resources such as a traffic channel are assigned. If, after a predetermined period of time there is no data to send, the cellular resources, i.e., the connection via the traffic channel, will be released to conserve cellular system resources but the Link Layer will remain open and go to the dormant connection state. As long as the Link Layer remains open, a connection may be reactivated whenever dedicated user data arrives or needs to be sent. A voice call may be originated at any time simultaneously with an instantiated packet data service via a concurrent service negotiation process to configure the coder within the altered service of the wireless communication station 8 and the radio base station 3 reversed.

In view of the foregoing it will be evident to a person skilled in the art that various modifications may be made within the spirit and the scope of the invention as hereinafter defined by the appended claims and that the invention is thus not limited to the examples provided.

What is claimed is:

1. Apparatus for combining digital voice data and digital user data in frames formatted for wireless communication, the apparatus comprising:

a variable rate speech coder for converting a variable analog input speech signal to a digital voice data output;

a processor, adapted to receive digital user data and the digital voice data output from the variable rate speech coder, for combining the digital voice data and the digital user data in frames according to a wireless communication format, said format reserving at least a dedicated minimum portion of each frame for digital user data even when the output of the speech coder is at a full rate output.

2. The apparatus of claim 1 wherein the processor is further operable to set the variable rate speech coder at a lower rate than the full rate, and to increase the rate of the dedicated user data by using bits becoming available from the lower rate setting of the speech coder.

3. The apparatus of claim 1 wherein a fraction of the bits in the frame are utilized for signaling purposes.

4. The apparatus of claim 1 wherein the processor is further operable to set the speech coder at a lower rate than the full rate, and to increase the rate of the dedicated user data by using bits becoming available from the lower rate setting of the speech coder, the system further being configured to use a fraction of the bits in the frame for signaling purposes.

5. The apparatus of claim 1 wherein the processor is further operable to set a service configuration as regards types of traffic in the frame.

6. The apparatus of claim 5 wherein the service configuration is a default configuration instantiated by either a wireless communication station or a wireless communication infrastructure network at call setup, the apparatus comprising means for altering the default configuration upon request by either the wireless communication station or the wireless communication network during a call.

7. The apparatus of claim 1 further comprising routing and processing means for independently routing processing of the speech data and the dedicated user data.

8. The apparatus of claim 1 wherein said apparatus is coupled to a switched telephone network, the system being configured to set up a transparent speech link between a wireless communication station and the switched telephone network.

9. The apparatus of claim 1 wherein said apparatus is coupled to a data server network, the apparatus being configured to set up a non-transparent radio link protocol over the air-interface via which the dedicated user data are exchanged between a wireless communication station and the data server network.

10. The apparatus of claim 9 wherein the data server network is an internet.

11. The apparatus of claim 9 wherein the data server network is a packet switched network.

12. The apparatus of claim 11 wherein said apparatus is configured to open a packet data service upon instantiation by a wireless communication station.

13. The apparatus of claim 12 wherein said apparatus is configured to activate the packet data service.

14. The apparatus of claim 13 wherein said apparatus is configured to render an active packet data service dormant.

15. The apparatus of claim 1 wherein said format includes a multi-mode bit which indicates whether the variable rate speech coder is operating at a fill rate or a less than full rate.

16. The apparatus of claim 1 wherein said format includes at least one control bit which indicates a rate of operation for the variable rate speech coder.

* * * * *